US008984971B2

(12) United States Patent
Naoi et al.

(10) Patent No.: US 8,984,971 B2
(45) Date of Patent: Mar. 24, 2015

(54) PARALLEL SLIDER DEVICE WITH A PNEUMATIC LINEAR GUIDE, CONTROL METHOD THEREFOR AND MEASURING DEVICE USING SAME

(75) Inventors: Kaoru Naoi, Yokohama (JP); Yoichi Ishizaki, Sodegaura (JP); Tatsuhito Inouchi, Ichihara (JP); Koichi Sekiguchi, Kimitsu (JP)

(73) Assignee: Kuroda Precision Industries Ltd., Kanagawa (JP)

(*) Notice: Subject to any disclaimer, the term of this patent is extended or adjusted under 35 U.S.C. 154(b) by 324 days.

(21) Appl. No.: 13/261,422

(22) PCT Filed: Mar. 10, 2010

(86) PCT No.: PCT/JP2010/001714
§ 371 (c)(1),
(2), (4) Date: Sep. 4, 2012

(87) PCT Pub. No.: WO2011/111100
PCT Pub. Date: Sep. 15, 2011

(65) Prior Publication Data
US 2012/0318078 A1    Dec. 20, 2012

(51) Int. Cl.
*G01B 21/08* (2006.01)
*F16C 29/02* (2006.01)
(52) U.S. Cl.
CPC .............. *F16C 29/025* (2013.01); *G01B 21/08* (2013.01)
USPC ....................................... 73/866.5
(58) Field of Classification Search
CPC .............................. G01B 21/08; F16C 29/025

USPC ............ 73/866.5; 310/12.01, 15; 33/533, 549
See application file for complete search history.

(56) References Cited

U.S. PATENT DOCUMENTS

| 6,367,159 | B1 | 4/2002 | Naoi et al. |
| 6,441,905 | B1 | 8/2002 | Tojyo et al. |
| 6,870,286 | B2 * | 3/2005 | Nakamoto et al. ......... 310/12.19 |
| 2007/0056958 | A1 * | 3/2007 | Shinohira et al. ............. 219/619 |
| 2009/0297075 | A1 * | 12/2009 | Muneishi ........................ 384/12 |

FOREIGN PATENT DOCUMENTS

| JP | 58-177245 | A | 10/1983 |
| JP | 4-347008 | A | 12/1992 |
| JP | 5-215133 | A | 8/1993 |
| JP | 6-330944 | A | 11/1994 |
| JP | 11-351857 | A | 12/1999 |
| JP | 2000337858 | A | 12/2000 |
| JP | 2003508696 | A | 3/2003 |
| JP | 2004330405 | A | 11/2004 |
| JP | 2007-146995 | A | 6/2007 |
| JP | 2008-067463 | A | 3/2008 |
| JP | 4132503 | B2 | 8/2008 |

* cited by examiner

*Primary Examiner* — Daniel S Larkin
(74) *Attorney, Agent, or Firm* — Marshall & Melhorn, LLC

(57) ABSTRACT

In a parallel slider device with a pneumatic linear guide, the stiffness of the mechanical coupling and the air bearing stiffness are prevented from interfering each other such that the parallelism between the two sliders can be maintained at a high precision in a highly reproducible manner. A difference in the slider support stiffness (air bearing stiffness) between a first pneumatic linear guide and a second pneumatic linear guide by varying the sizes of the air gaps and the supply air pressures so that any error in the linearity is accommodated by the changes in the air gap on the side of the linear guide having a lower slider support stiffness in a stable manner.

11 Claims, 6 Drawing Sheets

PARALLEL SLIDER DEVICE WITH A PNEUMATIC LINEAR GUIDE, CONTROL METHOD THEREFOR AND MEASURING DEVICE USING SAME

FIELD OF THE INVENTION

The present invention relates to a parallel slider device with a pneumatic linear guide, a control method therefor and a measuring device using the same, and in particular to a parallel slider device including a pair of sliders slidably guided by respective guide rails using a pneumatic linear guide, a control method therefor and a measuring device using the same.

BACKGROUND ART

A known measuring device for measuring the flatness (thickness variations) of the front and back sides of a thin disk (measuring object) having a large diameter such as a 300 mm diameter silicon wafer includes a support unit for supporting a measuring object in parallel with a prescribed plane such as a vertical plane, a first and second linear guide rail extending in parallel with the prescribed plane on either side of the measuring object, a first and second slider individually slidably supported by the first and second guide rails, respectively, a first measuring means (displacement meter) mounted on the first slider for measuring a distance to the front side (front face) of the measuring object, and a second measuring means for measuring a distance to the back side (rear face) of the measuring object. See Patent Document 1, for instance.

The linear guide mechanism that guides the first and second sliders carrying the measuring means along the first and second guide rails typically consists of a pneumatic linear guide based on a static pressure bearing mechanism to ensure a highly precise linear movement. Such a slide mechanism is called as air slide mechanism.

In such a measuring device, an individual air slide mechanism is required to be provided on each side of the support unit supporting the measuring object (extending vertically). By placing each guide rail at a height corresponding to the height at which the displacement meter scans the measuring object such as a silicon wafer, the distance between the guide rail and the displacement meter can be reduced as compared to the case where the guide rail is provided in a lower part of the support unit.

Thereby, the roll error caused by the angular displacement of the slider around the axial center line of the guide rail can be minimized as this error increases in proportion to the vertical distance between the guide rail and the displacement meter. By reducing the roll error, the flatness of both the front and back sides can be individually measured at a high precision.

PRIOR ART DOCUMENT(S)

Patent Document(s)

Patent Document 1: JP11-351857A

However, in this case, because the air slide mechanism is provided individually on each of the front and back sides of the support unit, the two sliders are required to be individually actuated in synchronism, and any unevenness in the traversing speeds of the two sliders could cause errors in the measuring position of the measuring object between the front and back sides thereof. This would cause errors in the measurement of the thickness of the measuring object. Also, any error in parallelism between the axial centers of the two independently provided air slide mechanisms could cause errors in the measurement of the thickness of the measuring object.

Based on this consideration, the inventors of the present invention have considered the possibility of mechanically coupling the two sliders with the aim of removing the unevenness in the traversing speeds of the two sliders and ensuring the required parallelism of the two air slide mechanisms.

However, the guide rails forming the two independent air slide mechanisms inevitably include some linearity errors and roll errors. When the two sliders are moved in synchronism with each other, even a small error in the linearity of either one of the guide rails causes the relative distance between the two sliders in the direction perpendicular to the direction of the traversing movement to change.

Bearing this in mind, suppose that the two sliders are mechanically coupled with each other. If the stiffness of the mechanical coupling between the two sliders is high, an error in the relative distance between the two sliders may be avoided. However, because each slider is totally constrained by a certain air bearing stiffness, the stiffness of the mechanical coupling and the air bearing stiffness may interfere with each other so that the relative distance between the two sliders may become uncertain.

More specifically, when the two sliders are mechanically coupled with each other, the interference between the stiffness of the mechanical coupling and the air bearing stiffness (the stiffness in supporting the slider by the pneumatic linear guide) may result in the reduction in the reproducibility of parallelism between the two sliders.

In view of such problems of the prior art, a primary object of the present invention is to provide a parallel slider device with a pneumatic linear guide or a parallel air slide mechanism in which the two sliders can be mechanically coupled with each other without causing the stiffness of the mechanical coupling and the air bearing stiffness from interfering each other such that the parallelism between the two sliders can be maintained at a high precision in a highly reproducible manner.

Means to Accomplish the Task

The present invention provides a parallel slider device, comprising a first guide rail and a second guide rail that are disposed parallel to each other; a first slider and a second slider slidably supported by the first and second guide rails, respectively, along a lengthwise direction of the guide rails; a first pneumatic linear guide providing an air gap between the first guide rail and the first slider; and a second pneumatic linear guide providing an air gap between the second guide rail and the second slider; wherein the first and second sliders are mechanically coupled to each other, and a slider supporting stiffness of the first pneumatic linear guide is different from that of the second pneumatic linear guide.

The slider support stiffness of the pneumatic linear guide can be varied between the first pneumatic linear guide and the second pneumatic linear guide by varying the size of the air gap, the configuration of the static pressure air pocket, the diameter (inner diameter) of the air ejection port that supplies air pressure to the air gap and the pressure receiving surface area of the slider and the supply air pressure level.

The present invention also provides a method for controlling a parallel slider device, the parallel slider device comprising a first guide rail and a second guide rail that are disposed parallel to each other, a first slider and a second slider slidably supported by the first and second guide rails, respectively, along a lengthwise direction of the guide rails, a first pneumatic linear guide providing an air gap between the first guide rail and the first slider and a second pneumatic linear guide providing an air gap between the second guide rail and the second slider, the first and second sliders being mechanically coupled to each other, wherein an air pressure control is performed such that an air pressure supplied to the first pneumatic linear guide is different from an air pressure supplied to the second pneumatic linear guide.

The present invention further provides a measuring device comprising the parallel slider device as defined above, wherein a support unit for supporting an measuring object is provided between the first guide rail and the second guide rail, and wherein a first measuring means is mounted on the first slider for measuring a distance to a first surface of the measuring object, and a second measuring means is mounted on the second slider for measuring a distance to a second surface of the measuring object.

Effect of the Invention

According to the parallel slider device with a pneumatic linear guide, as the slider supporting stiffness of the first pneumatic linear guide is different from that of the second pneumatic linear guide, the error in the linearity due to the changes in the air gaps can be effected by the air gap having a lower slider support stiffness or a lower air bearing stiffness in a stable manner.

Thereby, the stiffness of the mechanical coupling and the air bearing stiffness are prevented from interfering each other such that the parallelism between the two sliders can be maintained at a high precision in a highly reproducible manner.

PREFERRED EMBODIMENT(S) OF THE INVENTION

Now the present invention is described in the following in more detail in terms of concrete embodiments with reference to the appended drawings. In the following description, the directions such as the fore and aft, vertical and lateral directions are based on the directions indicated in the relevant drawings.

Figure 1:
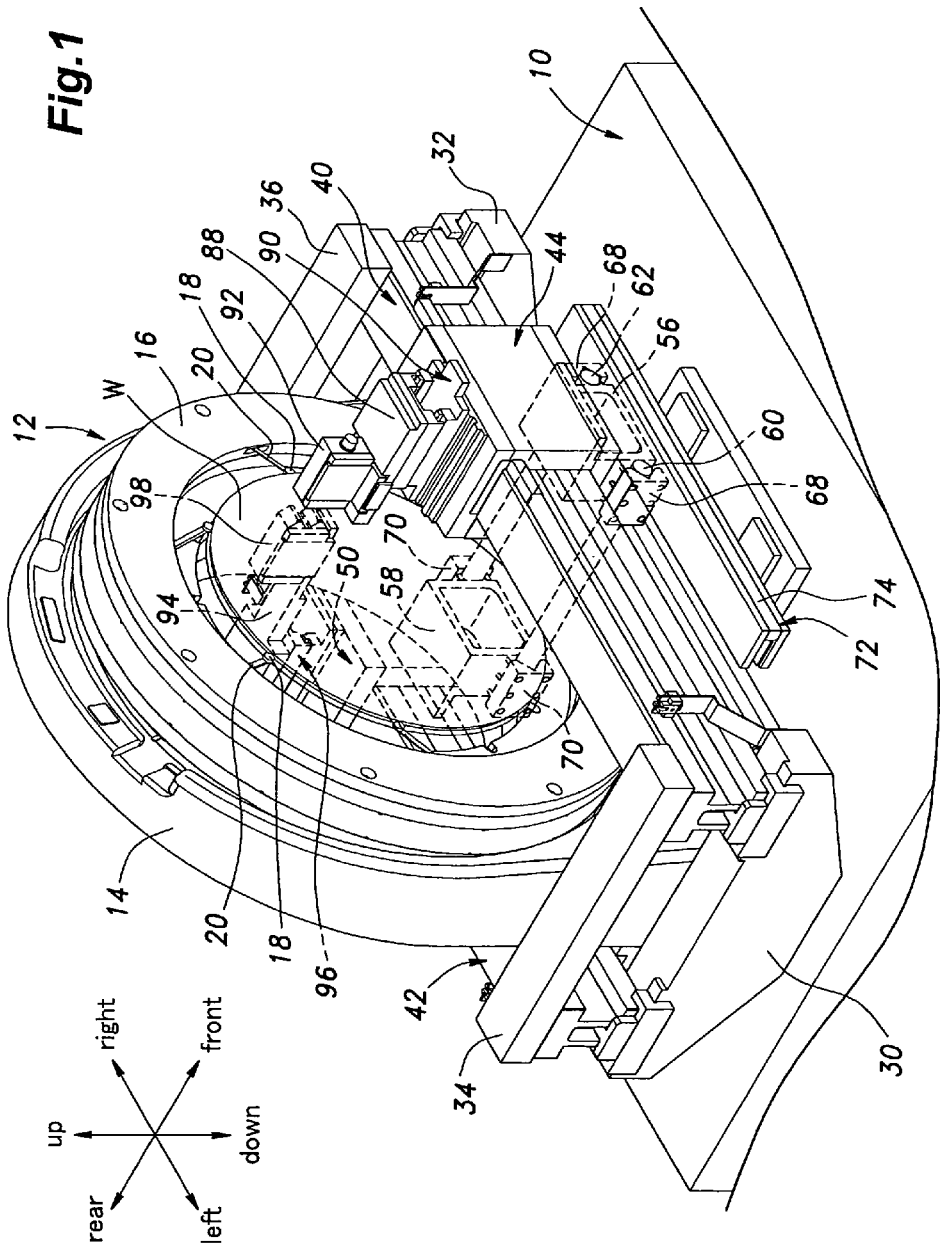
FIG. 1 is a perspective view showing a wafer flatness measuring device using a parallel slider device using a pneumatic linear guide given as an embodiment of the present invention.
Figure 2:
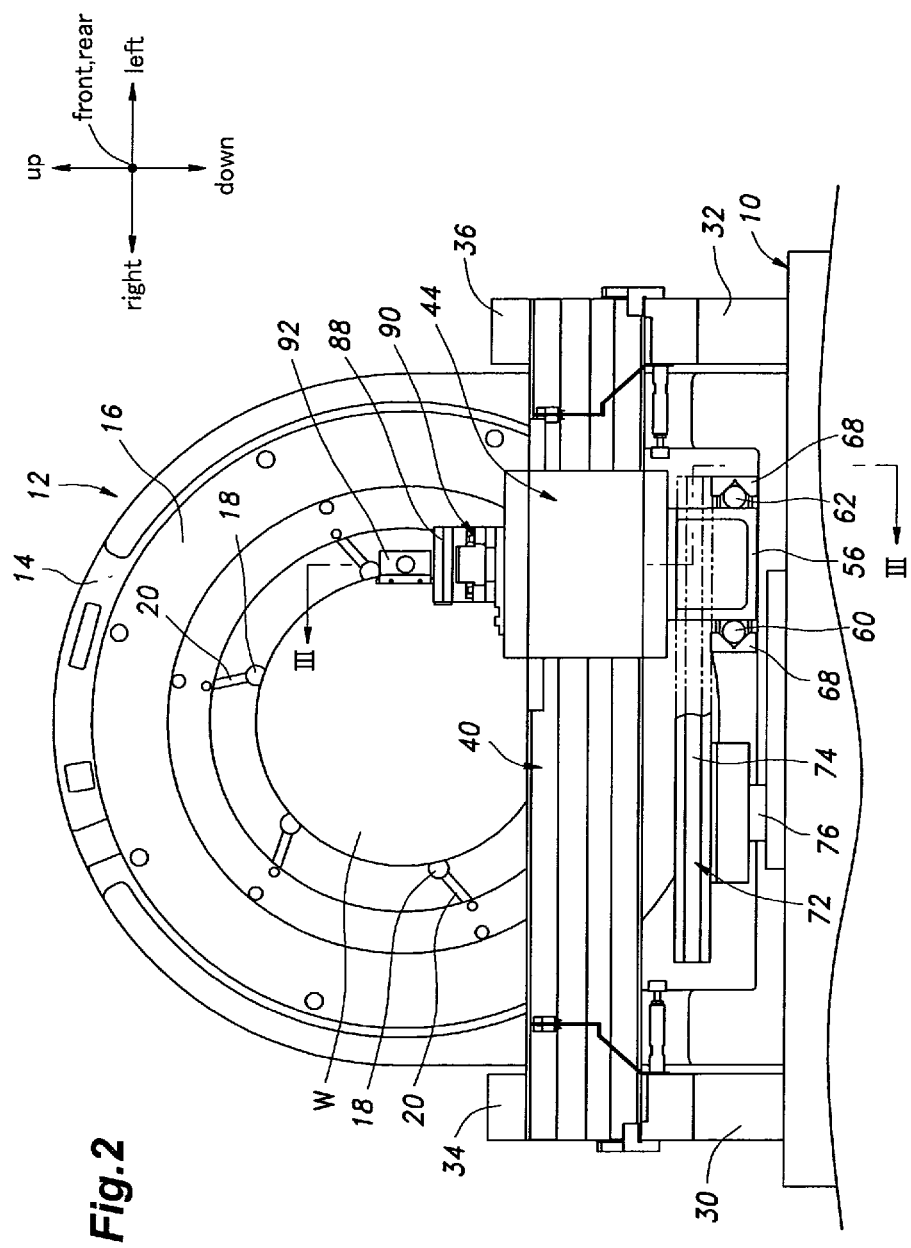
FIG. 2 is a front view of the wafer flatness measuring device.

As shown in FIGS. 1 and 2, a support unit 12 is placed on a horizontal upper surface of a base unit 10. The support unit 12 is configured to support a measuring object consisting of a disk-shaped silicon wafer W, and comprises an arch-shaped fixed base member 14 fixedly attached to the base unit 10 and an annular rotatable member 16 rotatably mounted on the fixed base member 14.

The annular rotatable member 16 is rotatably supported by the fixed base member 14 so as to be rotatable around a horizontal central axial line extending in the fore and aft direction via a fluid bearing or air bearing (not shown in the drawings). The inner periphery of the annular rotatable member 16 is provided with a plurality of support arms 20 each having a free end fitted with a roller 18 and arranged at a regular circumferential interval. The support arms 20 jointly support the silicon wafer W within the inner space of the annular rotatable member 16 in a vertical orientation with each roller 18 engaging the outer circumferential groove (not shown in the drawings) of the silicon wafer W. For more details of the structure for supporting the silicon wafer W, reference may be made to JP 4132503B2.

Although not shown in the drawings, the support unit 12 is incorporated with a brushless DC motor using the fixed base member 14 as the stator member and the annular rotatable member 16 as the rotor. This brushless DC motor drivingly rotates the annular rotatable member 16.

A pair of end brackets 30 and 32 are laterally arranged on the upper face of the base unit 10. The end brackets 30 and 32 are located on either lateral side of the support unit 12, and fixedly support the left ends of the and right ends of a front guide rail (first guide rail) 40 and a rear guide rail (second guide rail) 42 and the right ends of the front guide rail 40 and the rear guide rail 42, respectively, at the upper ends thereof.

More specifically, the front guide rail 40 consists of a linear rail having an I-shaped cross section including a lateral flange (40A, 40B) in each of the upper and lower ends thereof (see FIG. 3), and extends between the end brackets 30 and 32 with the lateral ends thereof fixedly secured to the upper parts of the corresponding end brackets 30 and 32 so as to extend horizontally along the front side of the support unit 12.

Likewise, the rear guide rail 42 consists of a linear rail having an I-shaped cross section including a lateral flange (42A, 42B) in each of the upper and lower ends thereof, and extends between the end brackets 30 and 32 with the lateral ends thereof fixedly secured to the upper parts of the corresponding end brackets 30 and 32 so as to extend horizontally along the back side of the support unit 12.

The front guide rail 40 and the rear guide rail 42 extend in parallel to each other at a same elevation.

The front guide rail 40 and the rear guide rail 42 are connected to each other at each of their lateral ends by a reinforcing connecting plate 34, 36 fixedly attached to the upper faces of the guide rails 40 and 42.

A front slider (first slider) 44 is supported on the front guide rail 40 so as to be moveable laterally or along the length of the guide rail. The front slider 44 is shaped as a rectangular tube by four rectangular plate members 44A to 44D that surround the front guide rail 40.

Figure 3:
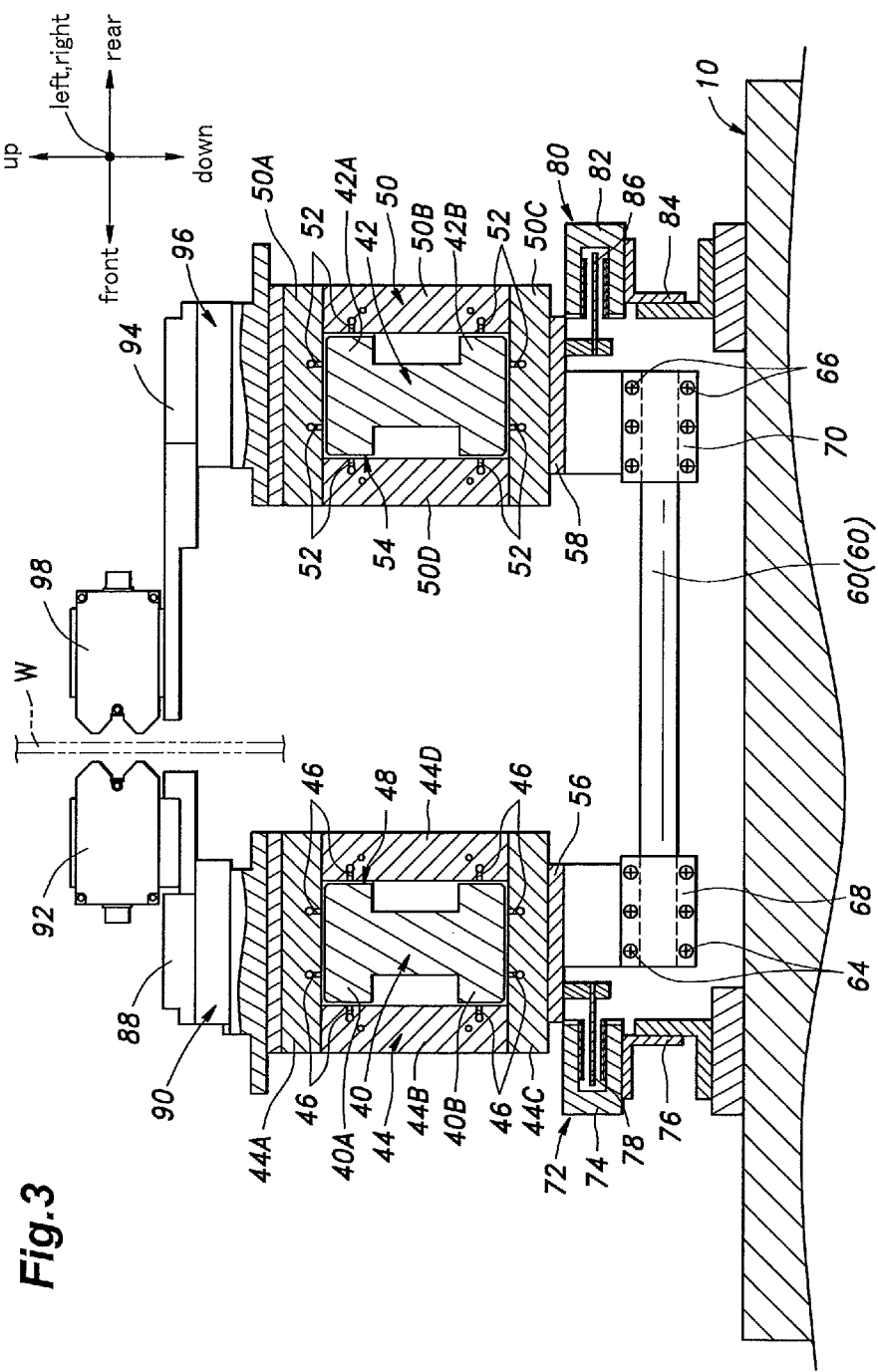
FIG. 3 is a sectional view taken along line of FIG. 2.

An air gap G1 (see FIG. 5) is defined between the inner faces of the four rectangular plate members 44A to 44D and the opposing faces of the front guide rail 40 that include the upper face and the fore and aft faces of the upper flange 40A and the lower face and the fore and aft faces of the lower flange 40B, and air ejection ports 46 are formed in the rectangular plate members 44A to 44D so as to face the opposing faces (see FIG. 3).

Figure 5:
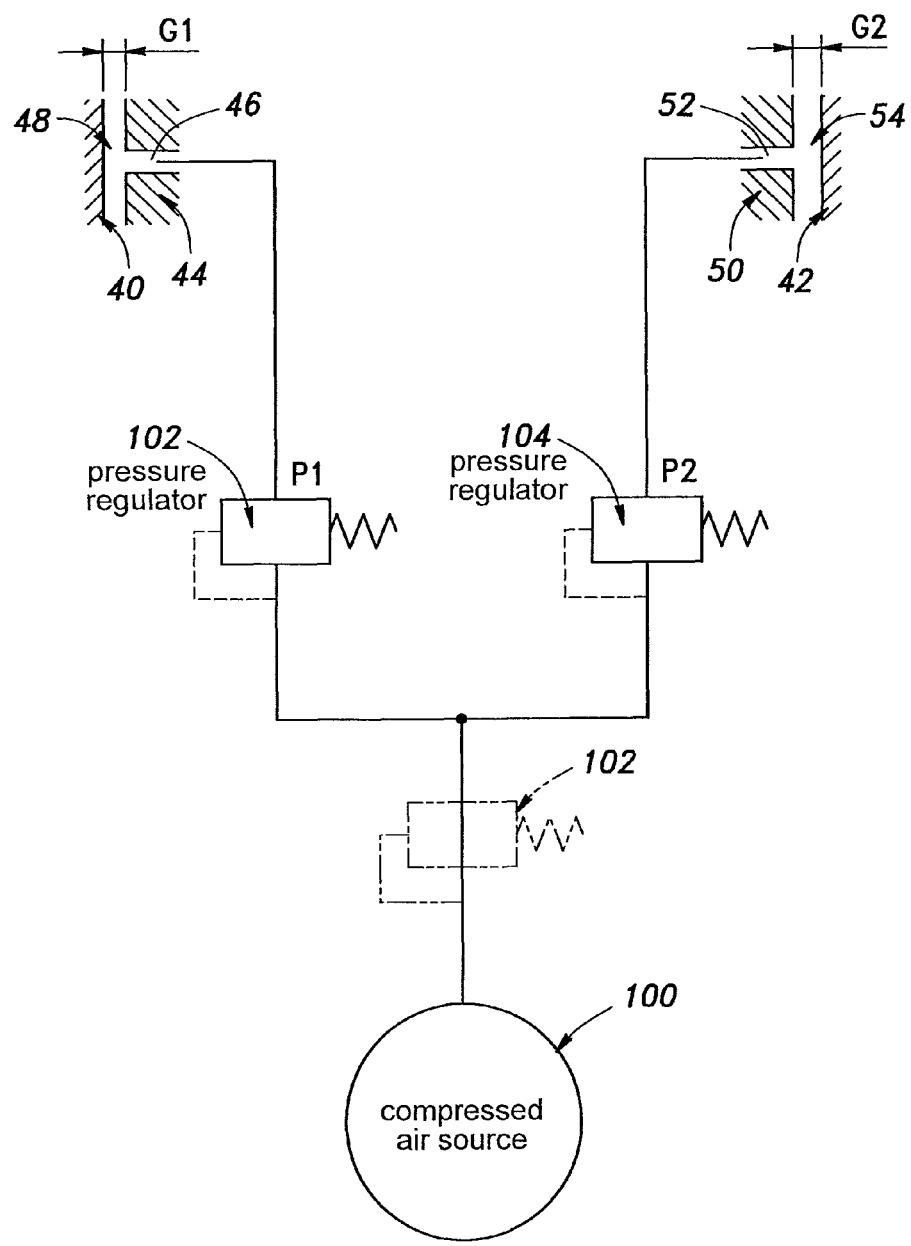
FIG. 5 is a pneumatic circuit diagram of a pneumatic control system that can be used in the parallel slider device using a pneumatic linear guide given as the embodiment of the present invention and the execution of the control process thereof.

To each air ejection port 46 is supplied a compressed air supplied from a compressed air source 100 and regulated to a first pressure P1 by a first pressure regulator 102 (see FIG. 5).

Thereby, a first pneumatic linear guide 48 consisting of a fluid bearing is formed between the front guide rail 40 and the front slider 44. The linear movement of the front slider 44 along the length of the front guide rail 40 is thus performed in a contactless manner via the first pneumatic linear guide 48.

Likewise, a rear slider (second slider) 50 is supported on the rear guide rail 42 so as to be moveable laterally or along the length of the guide rail. The rear slider 50 is shaped as a rectangular tube by four rectangular plate members 50A to 50D that surround the rear guide rail 42.

An air gap G2 (see FIG. 5) is defined between the inner faces of the four rectangular plate members 50A to 50D and the opposing faces of the rear guide rail 42 that include the upper face and the fore and aft faces of the upper flange 42A and the lower face and the fore and aft faces of the lower flange 42B, and air ejection ports 52 are formed in the rectangular plate members 50A to 50D so as to face the opposing faces (see FIG. 3).

To each air ejection port 52 is supplied a compressed air supplied from the compressed air source 100 and regulated to a second pressure P2 by a second pressure regulator 104 (see FIG. 5). Thereby, a second pneumatic linear guide 54 consisting of a fluid bearing is formed between the rear guide rail 42 and the rear slider 50. The linear movement of the rear slider 50 along the length of the rear guide rail 42 is thus performed in a contactless manner via the second pneumatic linear guide 54.

The air gaps of the first and second pneumatic linear guides 48 and 54 are exaggerated in FIGS. 3 and 5.

Figure 4:
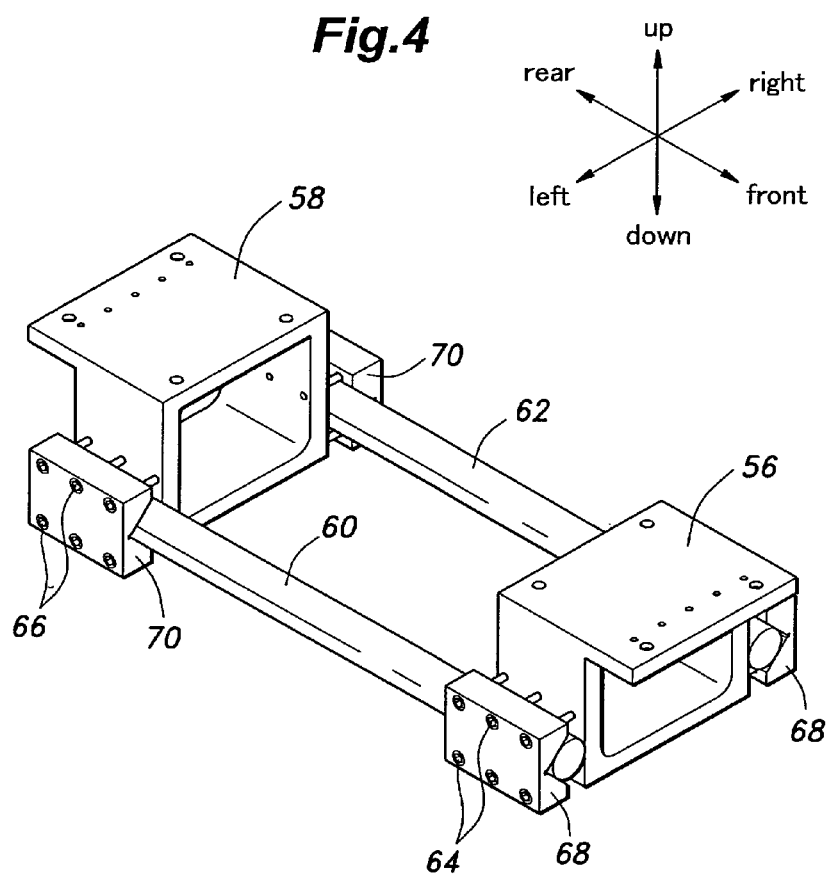
FIG. 4 is a perspective view of a sliders connecting mechanism of the parallel slider device using a pneumatic linear guide given as the embodiment of the present invention.

A connecting base member 56, 58 is fixedly attached to the bottom face of each of the front slider 44 and the rear slider 50. A pair of connecting rods 60 and 62 are connected between the two connecting base members 56 and 58 at either side thereof with each end of the connecting rods 60 and 62 fixedly connected to the corresponding side face of the corresponding base member via a V-block clamping member 68, 70 which is fastened to the corresponding base member side face with fastening screws 64, 66 (see FIG. 4). Thereby, the front slider 44 and the rear slider 50 are fixedly secured to each other with respect to both the lateral direction (scanning direction) and the fore and aft direction.

This mechanical coupling is accomplished by clamping each end of each connecting rod against a (flat) side face of the corresponding connecting base member 56, 58 by using a V-block clamping member 68, 70 so that a high lateral positioning precision can be achieved.

A stator member 74 of a front linear servo motor 72 is fixedly attached to a part of the base unit 10 located in front of the front guide rail 40 via a bracket 76. The stator member 74 is laterally elongated and extends in parallel with the front guide rail 40. A mover member 78 of the front linear servo motor 72 is fixedly attached the front slider 44. Thereby, the front slider 44 can be actuated by the front linear servo motor 72 in the lateral direction.

A stator member 82 of a rear linear servo motor 80 is fixedly attached to a part of the base unit 10 located behind the rear guide rail 42 via a bracket 84. The stator member 82 is laterally elongated and extends in parallel with the rear guide rail 42. A mover member 86 of the rear linear servo motor 80 is fixedly attached the rear slider 50. Thereby, the rear slider 50 can be actuated by the rear linear servo motor 80 in the lateral direction.

In this manner, the front slider 44 and the rear slider 50 can be actuated individually by the front linear servo motor 72 and the rear linear servo motor 80, respectively. Although not shown in the drawings, a linear scale is provided between the front guide rail 40 and the front slider 44, and between the rear guide rail 42 and the rear slider 50 to allow the lateral positions of the front slider 44 and the rear slider 50 to be detected.

The position control of the front linear servo motor 72 and the rear linear servo motor 80 are individually performed by a fully closed-loop feedback control using the actual positions of the front slider 44 and the rear slider 50 detected by the aforementioned linear scales (not shown in the drawings) as the feedback information, respectively, such that the lateral positions (scan positions) of the front slider 44 and the rear slider 50 are synchronized or made to coincide with each other.

A micro movement table unit 90 including a table 88 that can be moved in the fore and aft direction is mounted on the front slider 44, and a displacement meter 92 is mounted on the table 88. The displacement meter 92 may consist of a non-contact sensor such as a capacitive displacement meter, and is placed at a height corresponding to the center of the measuring object consisting of a silicon wafer W mounted on the annular rotatable member 16 to measure the distance to the opposing front surface of the silicon wafer W.

Likewise, a micro movement table unit 96 including a table 94 that can be moved in the fore and aft direction is mounted on the rear slider 50, and a displacement meter 98 is mounted on the table 94. The displacement meter 98 may also consist of a non-contact sensor such as a capacitive displacement meter, and is placed at a height corresponding to the center of the measuring object consisting of a silicon wafer W mounted on the annular rotatable member 16 to measure the distance to the opposing rear surface of the silicon wafer W.

The flatness of the silicon wafer W is measured by scanning the displacement meters 92 and 98 diametrically across the silicon wafer W by traversing the front slider 44 and the rear slider 50 while the silicon wafer W is rotated by the annular rotatable member 16, and measuring the distances between the displacement meter 92 and the front surface of the silicon wafer W and between the displacement meter 98 and the rear surface of the silicon wafer W.

An important point in this embodiment is that the second air gap G2 of the second pneumatic linear guide 54 is greater than the first air gap G1 of the first pneumatic linear guide 48. In this embodiment, the set pressure of the first pressure regulator 102 is equal to that of the second pressure regulator 104 so that a same pressure is supplied to both the first and second pneumatic linear guides 48 and 54.

Owing to this difference between the sizes of the air gaps, a corresponding difference is created between the slider support stiffness (air bearing stiffness) of the first pneumatic linear guide 48 and that of the second pneumatic linear guide 54 such that the slider support stiffness of the second pneumatic linear guide 54 is lower than that of the first pneumatic linear guide 48 insomuch as the second air gap G2 is greater than the first air gap G1.

As the front slider 44 and the rear slider 50 travel along the respective guide rails 40 and 42 extending in parallel with each other, any deviation in linearity in either of the guide rails 40 and 42 causes changes in the relative (fore and aft) distance between the front slider 44 and the rear slider 50 in a direction perpendicular to the traveling direction. When such a change in the relative distance occurs, because the slider support stiffness of the second pneumatic linear guide 54 is lower than that of the first pneumatic linear guide 48, the second air gap G2 of the second pneumatic linear guide 54 changes significantly more than the first air gap G1 of the first pneumatic linear guide 48 or the error that may be present in the linearity is accommodated by the changes in the air gap on the side of the linear guide having a lower slider support stiffness in a stable manner.

Thereby, changes in the relative distance between the front slider 44 and the rear slider 50 are avoided, and the mechanical stiffness of the mechanical coupling between the two sliders is prevented from interfering with the slider support stiffness. Therefore, a high level of parallelism can be maintained between the movements of the two sliders.

As a result, the stability in the relative distance between the front slider 44 and the rear slider 50 which are mechanically coupled with each other is improved so that the flatness or the thickness of the silicon wafer W can be measured at a high precision without being interfered by errors in linearity.

As a modified embodiment of the present invention, the first pneumatic linear guide 48 and the second pneumatic linear guide 54 may have different supply air pressures. In such an embodiment, the set pressure of the first pressure regulator 102 may be different from that of the second pressure regulator 104 so that the second air pressure P2 that is supplied to the second pneumatic linear guide 54 is somewhat lower than the first air pressure P1 that is supplied to the first pneumatic linear guide 48. In such an embodiment, the first air gap G1 of the first pneumatic linear guide 48 may be identical to the second air gap G2 of the second pneumatic linear guide 54.

Owing to the difference between the supply air pressures, a difference in the slider support stiffness (air bearing stiffness) is created between the first pneumatic linear guide 48 and the second pneumatic linear guide 54 so that the slider support stiffness of the second pneumatic linear guide 54 is made lower than that of the first pneumatic linear guide 48 insomuch as the second pressure P2 is lower than the first pressure P1.

In this embodiment also, changes in the relative distance between the front slider 44 and the rear slider 50 are avoided, and the mechanical stiffness of the mechanical coupling between the two sliders is prevented from interfering with the slider support stiffness. Therefore, a high level of parallelism can be maintained between the movements of the two sliders.

As a result, the stability in the relative distance between the front slider 44 and the rear slider 50 which are mechanically coupled with each other is improved so that the flatness or the thickness of the silicon wafer W can be measured at a high precision without being interfered by errors in linearity.

In the foregoing modified embodiment, the first pressure regulator 102 and the second pressure regulator 104 were arranged parallel to each other, but the first pressure regulator 102 having a higher set pressure may be connected in series with the second pressure regulator 104 having a lower set pressure with the first pressure regulator 102 located closer to the compressed air source 100 than the second pressure regulator 104 as indicated by the imaginary lines in FIG. 5.

If required, in addition to creating a difference between the first air gap G1 of the first pneumatic linear guide 48 and the second air gap G2 of the second pneumatic linear guide 54, a difference may be created between the supply air pressure of the first pneumatic linear guide 48 and the supply air pressure of the second pneumatic linear guide 54. In this case also, the control of the supply air pressures may be performed either by arranging the first pneumatic linear guide 48 and the second pneumatic linear guide 5 parallel to each other or by arranging the first pressure regulator 102 having a higher set pressure in series with the second pressure regulator 104 having a lower set pressure with the first pressure regulator 102 located closer to the compressed air source 100 than the second pressure regulator 104.

The bearing stiffness or slider support stiffness of a pneumatic linear guide depends on the configuration of the static pressure air pocket, the diameter (inner diameter) of the air ejection port that supplies air pressure to the air gap and the pressure receiving surface area of the slider, in addition to the size of the air gap and the supply air pressure level. Therefore, the difference in the slider support stiffness between the first pneumatic linear guide 48 and the second pneumatic linear guide 54 may be created by any of these measures.

Figure 6:
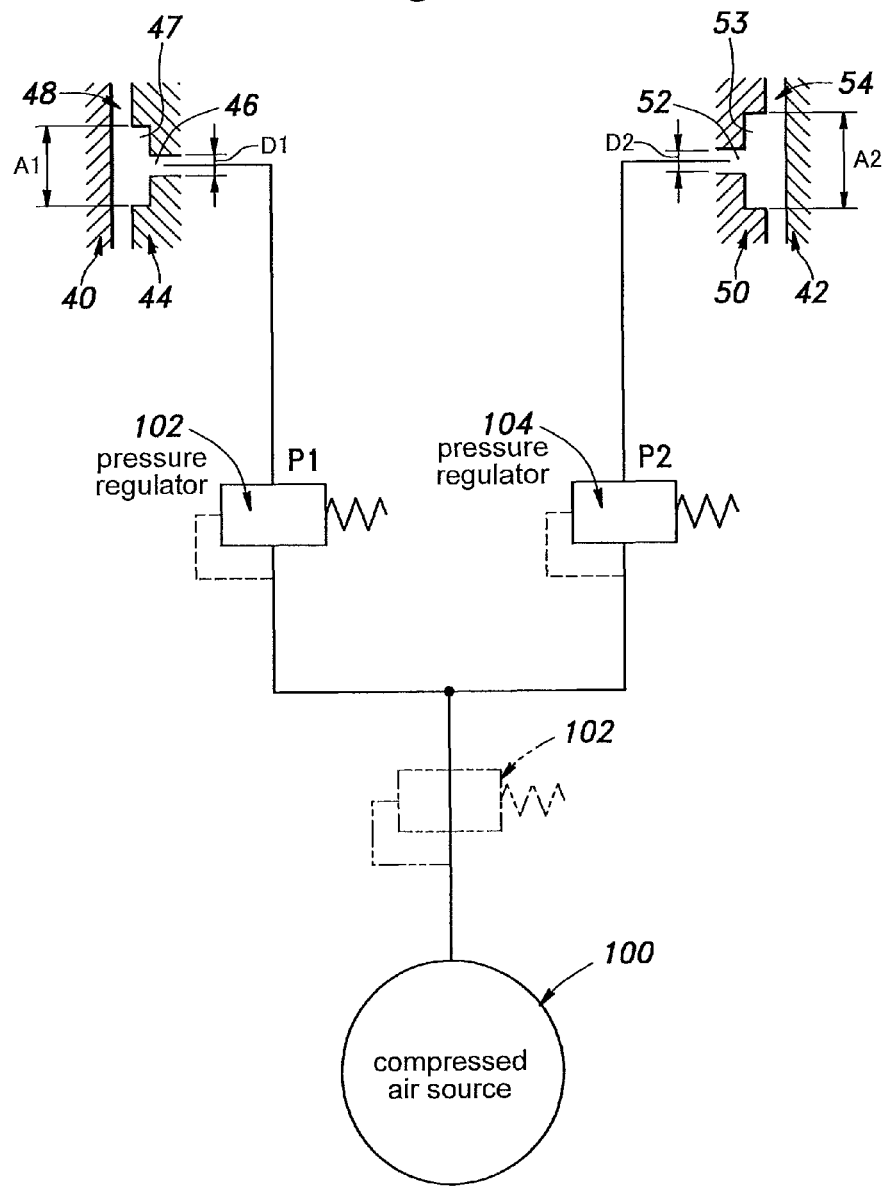
FIG. 6 is a pneumatic circuit diagram of a pneumatic control system that can be used in the parallel slider device using a pneumatic linear guide given as another embodiment of the present invention and the execution of the control process thereof.

In the embodiment illustrated in FIG. 6, the opening area A2 of a static pressure air pocket 52 formed in the rear slider 50 of the second pneumatic linear guide 54 and opening toward the air gap is greater than the opening area A1 of a static pressure air pocket 47 formed in the front slider 44 of the first pneumatic linear guide 48 and opening toward the air gap.

Further, in the embodiment illustrated in FIG. 6, the diameter D2 of the air ejection port 52 formed in the rear slider 50 to supply air pressure to the air gap of the second pneumatic linear guide 54 is greater than the diameter D1 of the air ejection port 46 formed in the front slider 44 to supply air pressure to the air gap of the first pneumatic linear guide 48.

The pressure receiving surface area of the front slider 44 in the first pneumatic linear guide 48 can be made different from the pressure receiving surface area of the rear slider 50 in the second pneumatic linear guide 54 by making the lateral (traveling direction) dimensions of the front and rear sliders 44 and 50 different from each other, and a smaller pressure receiving surface area means a lower slider support stiffness.

The pneumatic linear guides given with different levels of slider support stiffness may also be constructed by using porous air bearings.

Although the present invention has been described in terms of preferred embodiments thereof, it is obvious to a person skilled in the art that various alterations and modifications are possible without departing from the scope of the present invention.

The invention claimed is:

1. A parallel slider device, comprising:
    a first guide rail and a second guide rail that are disposed parallel to each other;
    a first slider and a second slider slidably supported by the first and second guide rails, respectively, along a lengthwise direction of the guide rails;
    a first pneumatic linear guide providing an air gap between the first guide rail and the first slider;
    a second pneumatic linear guide providing an air gap between the second guide rail and the second slider;
    a first pneumatic pressure setting device for setting the supplied air pressure of the first pneumatic linear guide at a first value; and
    a second pneumatic pressure setting device for setting the supplied air pressure of the second pneumatic linear guide at a second value;
    wherein the first and second sliders are mechanically coupled to each other, and the first and second values are set to be different from each other whereby a slider supporting stiffness of the first pneumatic linear guide is different from that of the second pneumatic linear guide.

2. A measuring device comprising the parallel slider device as defined in claim 1, wherein a support unit for supporting a measuring object is provided between the first guide rail and the second guide rail, and wherein a first measuring device is mounted on the first slider for measuring a distance to a first surface of the measuring object, and a second measuring device is mounted on the second slider for measuring a distance to a second surface of the measuring object.

3. A parallel slider device, comprising:
a first guide rail and a second guide rail that are disposed parallel to each other;
a first slider and a second slider slidably supported by the first and second guide rails, respectively, along a lengthwise direction of the guide rails;
a first pneumatic linear guide providing an air gap between the first guide rail and the first slider; and
a second pneumatic linear guide providing an air gap between the second guide rail and the second slider;
wherein the first and second sliders are mechanically coupled to each other, and wherein a size of the air gap between the first slider and the first guide rail is set to be different from a size of the air gap between the second slider and the second guide rail, whereby a slider supporting stiffness of the first pneumatic linear guide is different from that of the second pneumatic linear guide.

4. A measuring device comprising the parallel slider device as defined in claim 3, wherein a support unit for supporting a measuring object is provided between the first guide rail and the second guide rail, and wherein a first measuring device is mounted on the first slider for measuring a distance to a first surface of the measuring object, and a second measuring device is mounted on the second slider for measuring a distance to a second surface of the measuring object.

5. A parallel slider device, comprising:
a first guide rail and a second guide rail that are disposed parallel to each other;
a first slider and a second slider slidably supported by the first and second guide rails, respectively, along a lengthwise direction of the guide rails;
a first pneumatic linear guide providing an air gap between the first guide rail and the first slider; and
a second pneumatic linear guide providing an air gap between the second guide rail and the second slider;
wherein the first and second sliders are mechanically coupled to each other, and wherein the first and second pneumatic linear guides are each provided with a static pressure air pocket, an opening area of the static pressure air pocket for the first pneumatic linear guide being configured differently from an opening area of the static pressure air pocket for the second pneumatic linear guide, whereby a slider supporting stiffness of the first pneumatic linear guide is different from that of the second pneumatic linear guide.

6. A measuring device comprising the parallel slider device as defined in claim 5, wherein a support unit for supporting a measuring object is provided between the first guide rail and the second guide rail, and wherein a first measuring device is mounted on the first slider for measuring a distance to a first surface of the measuring object, and a second measuring device is mounted on the second slider for measuring a distance to a second surface of the measuring object.

7. A parallel slider device, comprising:
a first guide rail and a second guide rail that are disposed parallel to each other;
a first slider and a second slider slidably supported by the first and second guide rails, respectively, along a lengthwise direction of the guide rails;
a first pneumatic linear guide providing an air gap between the first guide rail and the first slider; and
a second pneumatic linear guide providing an air gap between the second guide rail and the second slider;
wherein the first and second sliders are mechanically coupled to each other, and wherein a diameter of an air ejection port for supplying a pneumatic pressure to the air gap of the first pneumatic linear guide is set to be different from a diameter of an air ejection port for supplying a pneumatic pressure to the air gap of the second pneumatic linear guide, whereby a slider supporting stiffness of the first pneumatic linear guide is different from that of the second pneumatic linear guide.

8. A measuring device comprising the parallel slider device as defined in claim 7, wherein a support unit for supporting a measuring object is provided between the first guide rail and the second guide rail, and wherein a first measuring device is mounted on the first slider for measuring a distance to a first surface of the measuring object, and a second measuring device is mounted on the second slider for measuring a distance to a second surface of the measuring object.

9. A parallel slider device, comprising:
a first guide rail and a second guide rail that are disposed parallel to each other;
a first slider and a second slider slidably supported by the first and second guide rails, respectively, along a lengthwise direction of the guide rails;
a first pneumatic linear guide providing an air gap between the first guide rail and the first slider; and
a second pneumatic linear guide providing an air gap between the second guide rail and the second slider;
wherein the first and second sliders are mechanically coupled to each other, and wherein a pressure receiving area of the first pneumatic linear guide for the first slider is set to be different from a pressure receiving area of the second pneumatic linear guide for the second slider by making lengthwise dimensions of the first and second sliders different from each other, whereby a slider supporting stiffness of the first pneumatic linear guide is different from that of the second pneumatic linear guide.

10. A measuring device comprising the parallel slider device as defined in claim 9, wherein a support unit for supporting a measuring object is provided between the first guide rail and the second guide rail, and wherein a first measuring device is mounted on the first slider for measuring a distance to a first surface of the measuring object, and a second measuring device is mounted on the second slider for measuring a distance to a second surface of the measuring object.

11. A method for controlling a parallel slider device,
the parallel slider device comprising a first guide rail and a second guide rail that are disposed parallel to each other, a first slider and a second slider slidably supported by the first and second guide rails, respectively, along a lengthwise direction of the guide rails, a first pneumatic linear guide providing an air gap between the first guide rail and the first slider, a second pneumatic linear guide providing an air gap between the second guide rail and the second slider, the first and second sliders being mechanically coupled to each other, a first pneumatic pressure setting device for setting the supply air pressure of the first pneumatic linear guide at a first value and a second pneumatic pressure setting device for setting the supply air pressure of the second pneumatic linear guide at a second value;
wherein the method includes a step in which an air pressure control is performed such that an air pressure supplied to the first pneumatic linear guide is different from an air pressure supplied to the second pneumatic linear guide by setting the first and second values to be different from each other.

* * * * *